Jan. 4, 1966 H. C. WENDEL 3,226,819
METHOD FOR ASSEMBLING AXLES
Filed Nov. 20, 1961 2 Sheets-Sheet 2
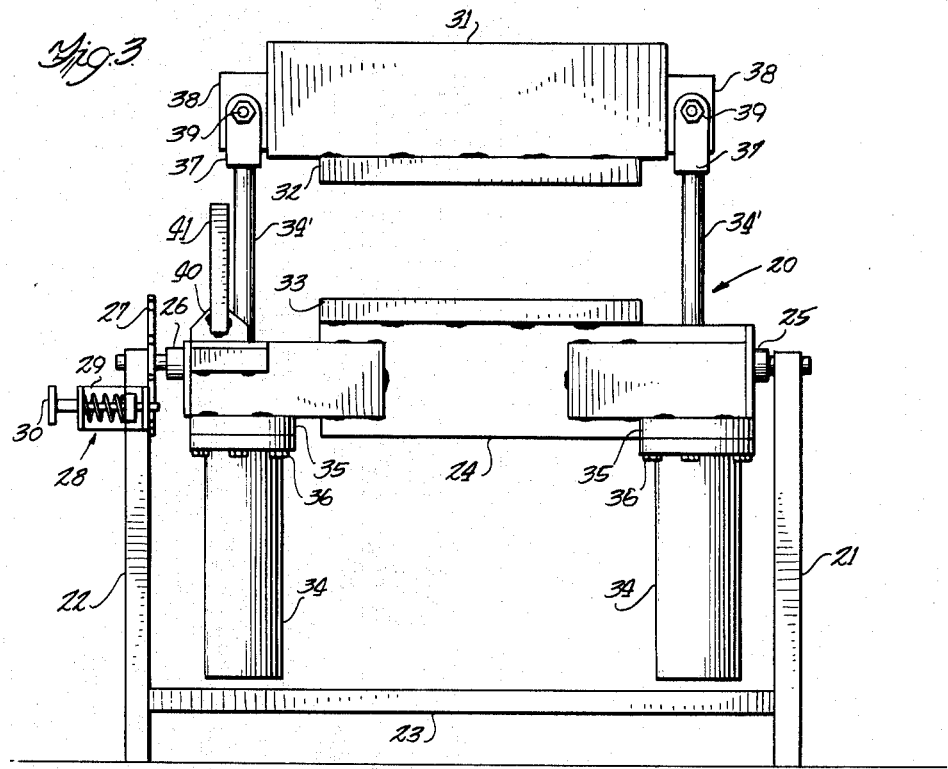
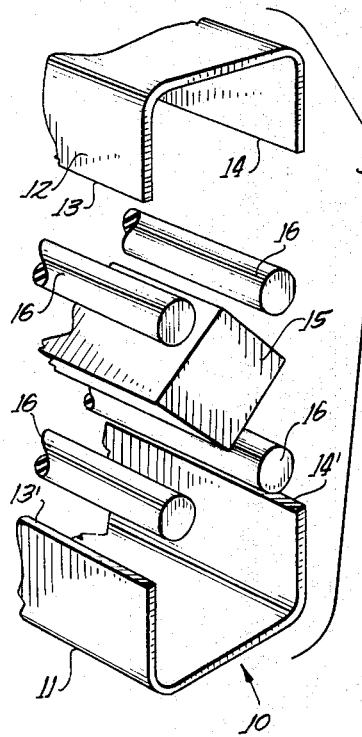
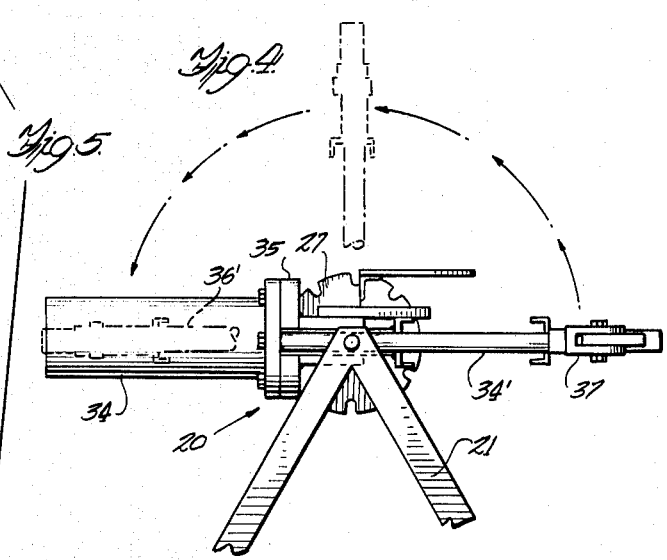
INVENTOR
HAMILTON C. WENDEL
Paul O. Pippel
ATTORNEY

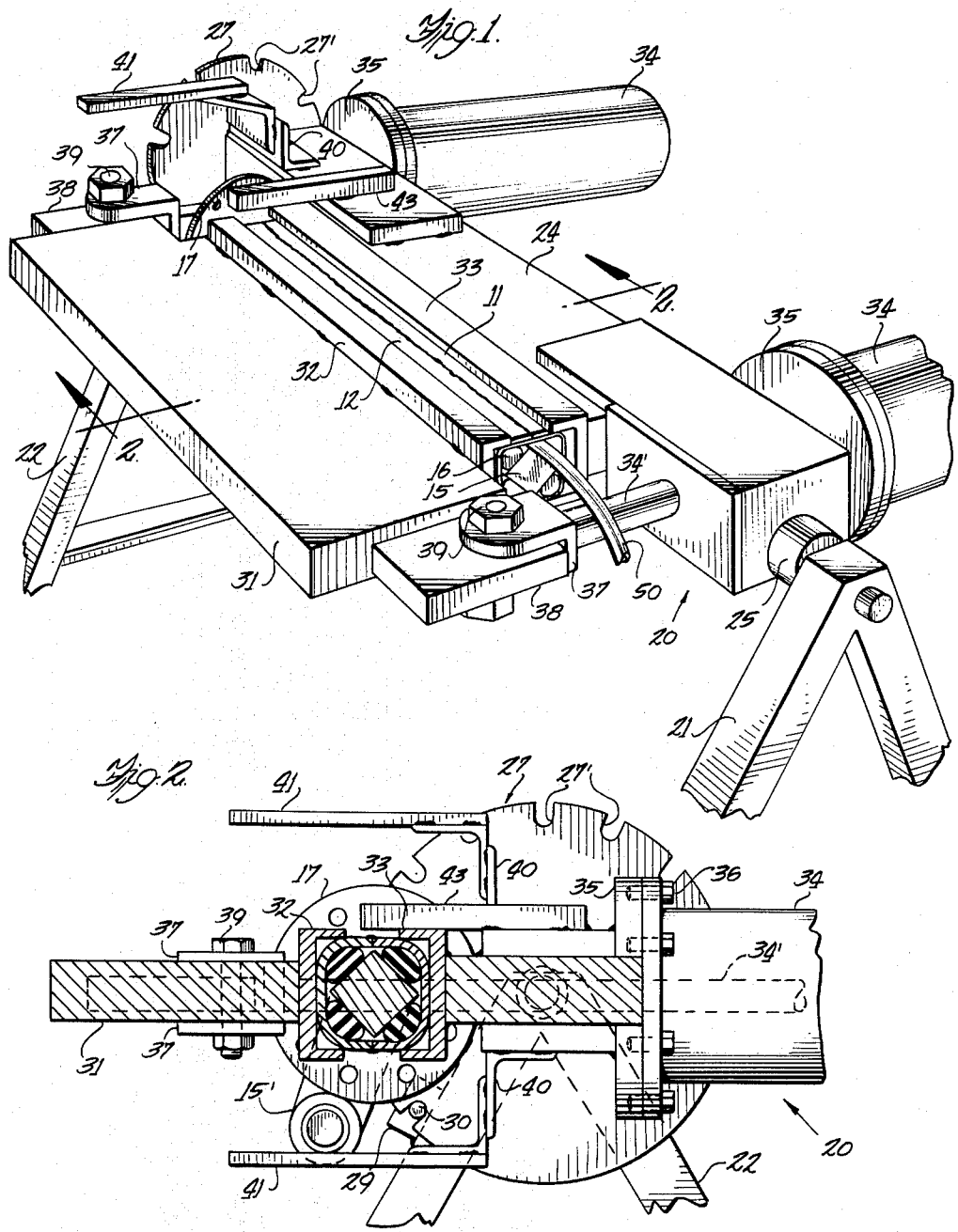

United States Patent Office 3,226,819
Patented Jan. 4, 1966

---

3,226,819
METHOD FOR ASSEMBLING AXLES
Hamilton Callaway Wendel, Stockton, Calif., assignor to International Harvester Company, Chicago, Ill., a corporation of New Jersey
Filed Nov. 20, 1961, Ser. No. 153,382
6 Claims. (Cl. 29—464)

This invention relates to a method of assembling trailer axles, and to a means for practicing this method. The axles, which are the subject matter of the present invention, are similar to those disclosed in United States Patents No. 2,712,742 and 2,729,442 to Herman J. Neidhart of Geneva, Switzerland.

One of the most critical problems confronting designers of axles of this type, has been the provision of an economical method for assembling the axles, which lends itself to present day rapid manufacturing methods. In certain applications, it has been found desirable and necessary to deform or precompress the resilient cushioning members, contained in the axle assembly, prior to the utilization of the device. To achieve this deformation, the general practice in the past was to place the cushioning elements in a mold under pressure, and to freeze them into a shape that would allow them to be installed into the axle, so that as they thawed out, they would assume the desired position. This method has proven to be not only costly, but also very time consuming. The general purpose of the present invention is therefore, to provide a method for assembling axles of the type hereinafter described, which is both simple and inexpensive. To achieve this, the invention also contemplates a novel fixture on which the method may be practiced.

Another object of the present invention is to provide a method which elminates costly and time consuming steps, while still producing an axle having the necessary characteristics of strength and resilience.

A further object of the invention is the provision of a fixture for practicing the method which will allow the axles to be assembled by an economical manufacturing process such as welding.

Other objects and advantages of the invention will hereinafter become more fully apparent from the following description of the annexed drawings, which illustrate a preferred embodiment of the invention, and wherein:

FIGURE 1 is a perspective view of the fixture with the fixture slide in a horizontal or working position, and having the assembled axle in place;

FIGURE 2 is a cross sectional view taken along line 2—2 of FIGURE 1;

FIGURE 3 is a front view of the fixture with the fixture slide in a vertical or loading position.

FIGURE 4 is a view similar to FIGURE 2, showing the fixture in one working position in solid lines, and showing the fixture in the loading position and the other working position in broken lines; and FIGURE 5 is an exploded detail view of the axle of the present invention.

Referring now to the drawings, wherein like reference characters designate like or corresponding parts throughout the several views, there is shown in FIGURE 5 an axle indicated in its entirety by reference numeral 10. Axle 10 includes an outer member formed from two U-shaped channel elements 11 and 12, each having a semi-circular flange 17 affixed to one end. Channel elements 11 and 12 are secured together along edges 13–13' and 14–14' to form a substantially square in the cross section tubular outer member having a circular flange at one end. An inner member, having a generally square in cross section portion 15, is concentrically disposed within the outer member, with the faces of portion 15 adjacent the apexes of the outer member. The inner member has an end portion 15', which is offset from and parallel to portion 15, and which extends outwardly from the flanged end of the outer member. Cylindrical cushioning elements 16 are nested between and engaged by a pair of adjacent inner faces of the outer member and by one outer face of the inner member.

Referring now to FIGURES 1 through 3, a fixture 20 is shown on which axle 10 is assembled. Fixture 20 is supported by a frame consisting essentially of a pair of spaced-apart A-shaped members 21 and 22 connected by supporting beam members 23. Fixture 20 includes a transversely extending bed member 24 havings its end portions 25 and 26 mounted for rotation in frame members 21 and 22.

A circular disk 27 is mounted on end portion 26 of bed 24, and contains a plurality of notches 27'. Stop means 28 are mounted on frame member 22, and consist essentially of a bracket 29 having threaded apertures therein, and a spring biased lock bolt 30 cooperable with said threaded apertures. Lock bolt 30 is selectively engageable with the notched portions 27' of disk 27 to secure bed member 24 in one of a plurality of positions.

A slide or clamp member 31 is mounted on the fixture for movement toward and away from bed member 24. A generally U-shaped axle holding member 32 is secured to the lower portion of slide 31, and cooperates with a similarly shaped axle holding member 33 mounted on bed 24 to clamp the axle 10 therein.

A pair of spacer-apart hydraulic cylinders 34 are provided for moving slide 31 with respect to bed 24. Cylinders 34 are connected to a source of hydraulic fluid by means that are well known in the art, not shown, and form no part of the present invention. A pair of circular flanges 35 are secured to bed members 24, and have cylinders 34 mounted thereon, as by bolts 36 or the like. Piston rods 34' of cylinders 34 are slidably mounted in ed 24, and have a bifurcated end portion 37 secured to the transversely extending ear portions 38 of slide members 31 by bolts 39.

A pair of bracket members 40 are mounted on opposite sides of bed member 24, and have secured thereto a first stop member 41, which is engageable with inner axle member portion 15' to support portion 15 in holding members 32 and 33. A second stop member 43 is mounted on bed 24, and is engageable with flange 17 of the outer axle member to transversely align the axle in holding members 32 and 33.

The process for assembling axle 10 will be best understood from an examination of FIGURES 3 through 5. The operator first rotates fixture 24 until the parts assume the position shown in FIGURE 3. Lock bolt 30 is then engaged with the appropriate notch 27' to lock the fixture in this position. Channel member 11 is then placed in holding member 33, with the arms of the U-shaped section pointing vertically upward. Cushioning members 16 are then placed in each corner of channel member 11. Inner axle member 15 is then aligned with respect to channel member 11 so as to dispose its faces adjacent the apexes of channel member 11. Offset axle portion 15' is supported on stop member 41, and flange portion 17 is positioned against stop member 43, so as to transversely align the axle parts with respect to holding member 33. Additional cushioning elements 16 are then disposed over the remaining exposed faces of inner axle member 15, and the second U-shaped member 12 is placed thereover with the leg portions extending vertically downward. The hydraulic cylinders 34 are then actuated to retract piston rods 34', thereby lowering slide member 31 and holding member 32, which engages channel member 12 to bring edges 13–13' and 14–14' into abutment. Lock bolt 30 is then disengaged from groove 27', and fixture 20 is rotated 90° with the axle parts in a clamped position to vertically expose either seam 13–13' or 14–14'. Lock bolt 30 is then re-engaged with the appropriate notch 27' to lock fixture 20 in this position. The operator then places coolant supply hose 50, made of rubber, plastic or the like, in the clamped axle assembly, and actuates the source of coolant, not shown, to force the coolant through the entire axle assembly. The coolant is preferably water, and the end of the hose 50 is disposed at the apex of member 15 to permit water to flow by gravity down the sides thereof in the space around member 15 and in contact with rubber cushioning elements 16, below the level of the upper seam. The upper seam between elements 11 and 12 is not engaged by the coolant and is in position for welding. The operator then welds the vertically exposed seam in the conventional downhand manner, while the coolant is being forced through the axle assembly to protect the cushioning elements. When the weld is completed, the operator terminates the flow of coolant, disengages lock bolt 30, rotates fixture 20 180° to vertically expose the other seam, re-engages lock bolt 30, and repositions coolant supply hose 50 in axle assembly 10. The coolant supply is again actuated, and the other seam is welded to complete the axle assembly.

It should be appreciated that while only a square axle has been shown in the various views of the drawing, the invention contemplates the assembly of any axle of the type described, such as those disclosed in the above referred to Neidhart patents, wherein the cross section of the inner and outer members are similar regular polygons. To adapt the fixture for use with various shaped axles, it would be necessary only to change the cross sectional shape of holding members 33 and 32, so as to substantially conform to the shape of the outer axle member sections. The fixture would be rotated as many times as was necessary to vertically expose and weld each seam formed at the junction of two outer axle member sections.

It should also be understood that the foregoing disclosure relates to only a preferred embodiment of the invention, and that numerous modifications or alterations may be made therein without departing from the spirit and the scope of the invention as set forth in the appended claims.

What is claimed is:

1. The method of assembling an axle having a first member concentrically disposed within a second member, said second member being formed of a plurality of sections, said first member having an offset end portion, the cross section of each of said members being a similar regular polygon, the outer faces of said first member being disposed adjacent the corners formed by the junction of two adjacent inner faces of said second member, and a plurality of resilient cushioning members disposed in the area between said first member faces and said second member corners, comprising the steps of disposing one of said second member sections in a fixture, placing a cushioning member in each corner of said section, aligning said first member with respect to said second member section and said cushioning members, disposing cushioning members adjacent the exposed faces of said first member, aligning the other second member sections with respect to said cushioning members and said first member, clamping said first and second members and said cushioning members into said fixture, rotating said fixture in the clamped condition to vertically expose the seam formed at the junction of two of said second member sections, simultaneously welding said seam and forcing a coolant through the interior of said axle below the level of said exposed seam to protect said cushioning members from the heat of said weld, repeatedly rotating said fixture to vertically expose each seam formed at the junction of said second member sections, and welding said seams while applying coolant through the interior of said axle below the level of the exposed seam to said cushioning members until a unitary second member is formed.

2. The invention set forth in claim 1 wherein said clamping step includes the deforming of said cushioning members.

3. The invention set forth in claim 1 wherein the step of aligning said first member with respect to said second member section and said cushioning members includes supporting the offset end of said first member on a stop means.

4. The method of forming an axle having an outer tubular member generally square in cross section, an inner member generally square in cross section concentrically disposed within said outer member, the faces of said inner member being disposed adjacent the apexes of said outer member, and a plurality of cylinders of elastic cushioning material disposed between the faces of said inner member and the apexes of said outer member, comprising the step of placing a U-shaped channel member in a similarly shaped fixture, inserting a cushioning element in each apex of said channel member, aligning said inner member with respect to said channel member and said cushioning elements, disposing a cushioning element adjacent the exposed faces of said inner member, positioning a second U-shaped channel member over said inner member, clamping said channel members together so as to cause the arms of said U-shaped members to abut, rotating said fixture 90° to vertically expose one seam formed at the junction of said arms, simultaneously welding said seam and forcing a coolant under said seam axially through the interior of said axle in contact with said cushioning elements and below the level of said exposed seam to protect the cushioning elements from the heat of the weld, rotating the fixture 180° to vertically expose the other seam formed at the junction of said arms, and simultaneously welding and forcing a coolant under said other seam axially through the interior of said axle in contact with said cushioning elements and below the level of said other seam to thereby form a unitary outer member.

5. The method of manufacturing an axle having a tubular outer member formed of a plurality of sections, an inner member concentrically disposed within said outer member, the cross section of each of said members being similar regular polygons, the outer faces of said inner member being disposed adjacent the corners formed at the junction of two adjacent inner faces of said outer member, and a plurality of resilient cushioning elements disposed in the area between said inner member faces and said outer member corners, comprising the steps of assembling the axle members into a fixture, clamping the members so as to bring the edges of the outer member sections into abutment, rotating the fixture so as to dispose one of the seams formed at the junction of two of said outer member sections into a working position, simultaneously applying a coolant to the interior of said axle in contact with said cushioning elements and below the level of the seam in working position and welding said seam, repeatedly rotating said fixture to selectively dispose each of the seams formed at the junction of said outer member sections in a working position, and welding said seams while applying coolant to the interior of said axle in contact with said cushioning elements and below the level of the seam in working position until a unitary outer member is formed.

6. For an axle of the type including a hollow casing polygonal in section, a shaft similarly polygonal in section axially received in said casing with the sides of the shaft facing the apexes of the rectangular casing, and oversized cylindrical cushioning members deformed in the space provided between each side of the shaft and the adjacent apex of the casing; the method of manufacturing said axle comprising the steps of forming said casing in two channel-shaped sections, assembling the shaft and oversized cylindrical cushioning members in the relationship referred to in said sections, clamping said sections together to squeeze and deform the cylindrical cushioning members in the space provided and with the edges of the channel-shaped sections in abutment to form seams, revolving the assembled axle with said seams successively uppermost, welding said seams and forcing a cooling fluid axially through the interior of the axle in contact with said cushioning members and below the level of the uppermost seam throughout the welding procedure.

References Cited by the Examiner

UNITED STATES PATENTS

| | | | |
|---|---|---|---|
| 1,319,850 | 10/1919 | Curley | 29—487 |
| 1,443,082 | 1/1923 | Mauck | 29—487 |
| 1,801,140 | 4/1931 | Chapman | 113—130 X |
| 1,969,840 | 8/1934 | Goddard | 29—487 X |
| 2,031,863 | 2/1936 | Snell. | |
| 2,259,023 | 10/1941 | Clark | 29—463 X |
| 2,671,957 | 3/1954 | Sheffer et al. | 113—130 X |
| 2,696,547 | 12/1954 | Felton et al. | 219—161 |
| 2,712,742 | 7/1955 | Neidhart | 64—14 |
| 2,808,801 | 10/1957 | Ulrichs | 113—99 |
| 2,833,910 | 5/1958 | Stanton et al. | 219—59 |
| 2,877,062 | 3/1959 | Hall et al. | |
| 2,938,480 | 5/1960 | Irwin | 113—99 |
| 3,015,238 | 1/1962 | Williams | 29—463 X |

JOHN F. CAMPBELL, *Primary Examiner.*